(No Model.)
H. R. BARNHURST.
LUMBER EDGING MACHINE.
No. 272,190. Patented Feb. 13, 1883.
Fig. 1.
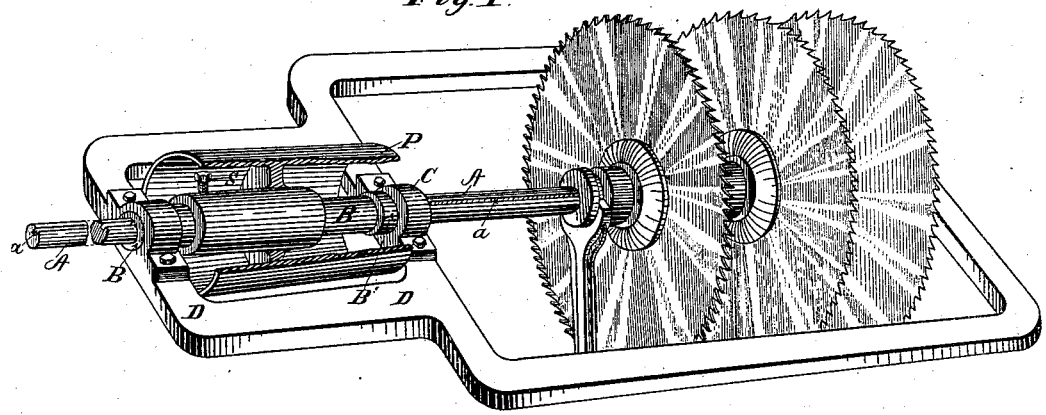
Fig. 2.
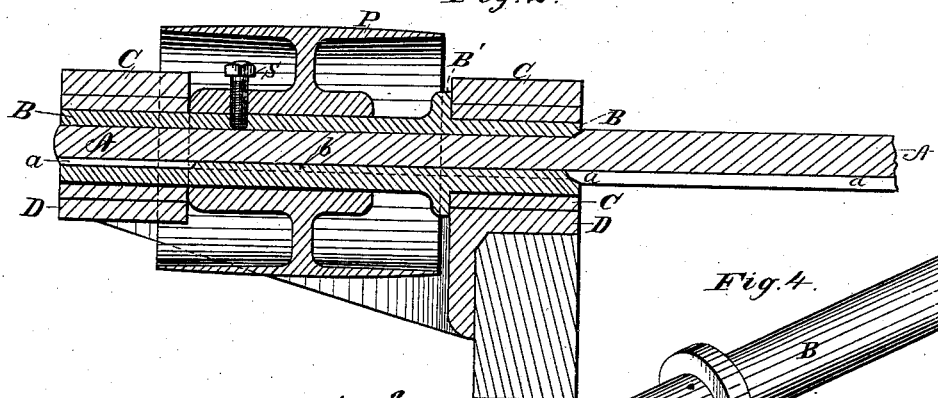
Fig. 3.
Fig. 4.
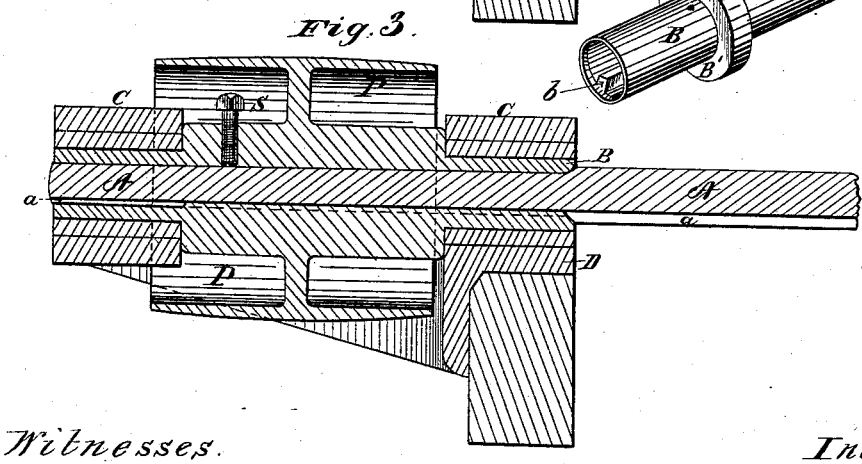
Witnesses.
W. R. Edelen.
A. B. Brown
Inventor.
H. R. Barnhurst
per Hallock & Hallock
Attys.

UNITED STATES PATENT OFFICE.

HENRY R. BARNHURST, OF ERIE, PENNSYLVANIA.

LUMBER-EDGING MACHINE.

SPECIFICATION forming part of Letters Patent No. 272,190, dated February 13, 1883.

Application filed July 7, 1881. Renewed August 2, 1882. (No model.)

*To all whom it may concern:*

Be it known that I, HENRY R. BARNHURST, a citizen of the United States, a resident of Erie, Erie county, Pennsylvania, have invented new and useful Improvements in Lumber-Edging Machines; and I do hereby declare that the following is a full, clear, and exact description thereof, reference being had to the accompanying drawings, and the letters or figures of reference marked thereon.

My invention consists in providing certain improvements in the construction of lumber-edging machines, whereby the saws can be removed for sharpening or other purposes with greater facility, as will be hereinafter fully pointed out.

In lumber-edging machines there are two or more saws upon an arbor, some of which are made to slide upon the arbor by a hand-lever and proper connections. In order to remove these saws from their arbor the arbor has to be taken from its bearings or boxes and the belt-pulley removed. By my improved construction the arbor can be removed from the frame and saws without disturbing the belt-pulley and bearings or journal-boxes adjacent, and the operation of removing the arbor and replacing the same is attended with no difficulty, and with very much less loss of time. In my device the belt-pulley is attached to or forms a part of a sleeve mounted in bearings or journal-boxes, and provided with a spline on its inner side, which fits in a groove on the arbor when the same is socketed in the sleeve. The arbor can be adjusted in the sleeve or removed therefrom at any time without disturbing the belt, belt-pulley, or journal-boxes.

My device is shown in the accompanying drawings, as follows:

Figure 1 is a perspective view, showing the frame, saws, arbor, journal-bearings, sleeve, and belt-pulley, which latter is broken away to show internal parts. Fig. 2 is a vertical longitudinal section along the arbor. Fig. 3 is the same view as Fig. 2, but shows the belt-pulley and the sleeve as formed of one piece of metal. Fig. 4 is a perspective view of the sleeve alone, the point of observation being from behind and above the saws, as shown in Fig. 1.

A is the arbor, and $a$ the groove. B is the sleeve, with shoulder B' and a spline, $b$, on the wall of its bore. C C are the journal-boxes, D the frame, P the belt-pulley, and S the set-screw, which holds the arbor in place when adjusted in the sleeve, and also, when the construction is as shown in Figs. 1, 2, and 4, holds the belt-pulley upon the sleeve. This set-screw is only depended upon to prevent an endwise movement of the arbor when running.

In all edging-machines having movable saws, I believe, a groove is made in the arbor; but it does not extend beyond the journals. I, however, extend the groove to the end of the arbor, and provide a proper spline, $b$, within the sleeve B, and thereby secure a rotation of the arbor when the pulley and sleeve revolve.

It will be plainly seen from the drawings that the arbor can be removed from place by simply loosening the set-screw S and drawing the arbor out of the sleeve, and may be readjusted in place by shoving it into the sleeve and tightening the set-screw, and that no disturbance of the journal-bearings or belt-pulley is necessary.

I do not wish to be limited to a spline and groove as the sole means by which the sleeve is secured to the arbor for the purposes of transmitting its motion to the arbor, for other mechanical devices may be used for this purpose—as, for example, the set-screw S may be relied upon for that purpose, as well as to prevent a lateral movement of the arbor.

I am aware that a saw-arbor has heretofore been mounted so as to slide laterally in its actuating-pinion; but such a construction was for the purpose of adjusting the saw from or toward a stationary gage. It is obvious that such a construction and purpose is in no way the same as mine, as above set forth, and forms no part of my invention.

What I claim as new is—

1. In a lumber-edging machine, the combination, with an arbor or shaft having thereon laterally-movable saws, of a sleeve journaled in proper bearings, and having thereon the actuating gear or pulley, and in which sleeve the said arbor is socketed when the machine is in use, and from which it may be detached without disturbing the belt-pulley when it is desired to dismount the saws, substantially as set forth.

2. In a lumber-edging machine, the combination, with the arbor which bears the laterally-movable saws, and which has thereon a groove, $a$, of a sleeve journaled in proper bearings, and having thereon the operating gear or pulley, and provided with a spline, $b$, whereby said sleeve is adapted, as described, to give motion to said arbor, and to permit the same to be removed therefrom for dismounting the saws without disturbing the belt-pulley.

In testimony that I claim the foregoing I have hereunto set my hand this 4th day of May, 1881.

HENRY R. BARNHURST.

Witnesses:
   JNO. K. HALLOCK,
   W. R. EDELEN.